(No Model.)
T. J. RIDER.
HOT AIR ENGINE.
No. 353,004.　　　　　　　　Patented Nov. 23, 1886.
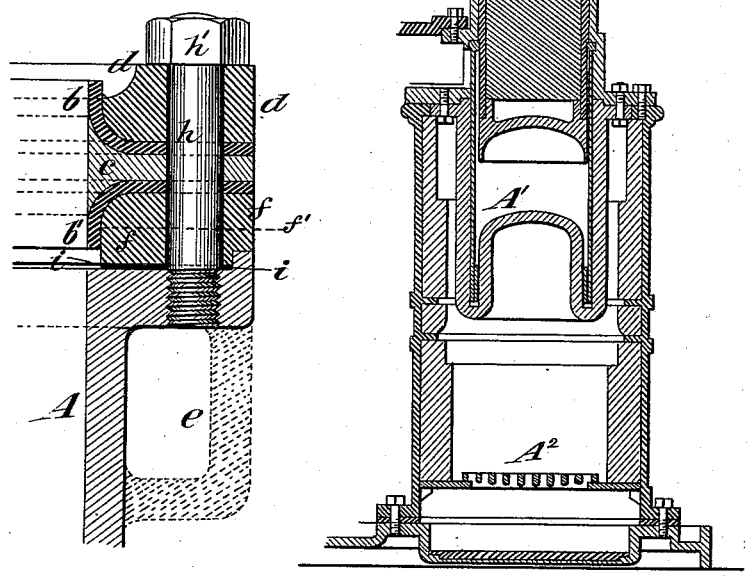

UNITED STATES PATENT OFFICE.

THOMAS J. RIDER, OF NEW YORK, N. Y.

HOT-AIR ENGINE.

SPECIFICATION forming part of Letters Patent No. 353,004, dated November 23, 1886.

Application filed August 5, 1886. Serial No. 210,143. (No model.)

*To all whom it may concern:*

Be it known that I, THOMAS J. RIDER, of the city and county of New York, in the State of New York, have invented a new and useful Improvement in Hot-Air Engines, of which the following is a specification.

In hot-air engines the hot piston, which is commonly of trunk form, works within an annular packing of leather or analogous material, which is liable to injury from heat, at the top of the hot cylinder, and unless some precautionary measure were taken the packing would soon become destroyed or greatly deteriorated by the heat transmitted to it through the metal of the cylinder. The upper end of the cylinder has usually formed the bed upon which one face of the packing-rings rests or is secured, and there has been nothing to break the continuity of conducting-surfaces from the hot body of the cylinder direct to the packing. In order to temper the heat of the upper portion of the cylinder close to the packing, it has been usual to surround that part of the cylinder by a water-jacket and supply water thereto for circulation, in order to prevent injury to the packing by the excessive heat. Such an arrangement is troublesome and expensive, both in the connections necessary to supply water to this jacket, and in getting rid of the water after it has performed its work in the jacket; and the object of my invention is to break the continuity of metal between the packing and the hot portion of the cylinder, and by a very simple construction to enable the water-jacket around the hot cylinder to be dispensed with.

The invention consists in the combination, with the cylinder and piston of a hot-air engine, and a packing of a material liable to injury by heat surrounding the piston, and which is depended on to prevent leakage of air, of a ring or rings made separate from and secured to the cylinder, and upon which the packing is supported, whereby the continuity of metal in the cylinder is broken between the hottest part of the cylinder and the packing, and the packing is preserved from injury without the employment of a water-jacket.

It is known that the conducting power of metal is greatly reduced by joints therein, even though such joints are formed by metal parts in face-to-face contact; and to this end I make the ring or rings which support the packing separate from the cylinder and secure it or them thereto. If desired, paper or other material which is a poor heat-conductor may be interposed as a packing between the top of the cylinder and the ring or rings which directly support the packing-rings of leather or other material.

In the accompanying drawings I have represented by sectional elevation in Figure 1, in order to illustrate my invention, the hot cylinder, piston, and appurtenances of an engine such as is described in Letters Patent No. 220,309, granted October 7, 1879, to Alexander K. Rider, and which operates in closed cycle, the air within the engine being confined, and being alternately heated and cooled and compressed. Fig. 2 represents upon a larger scale a vertical section through one side portion of the packing and its rings, and a portion of the cylinder supporting the same.

Similar letters of reference designate corresponding parts in both the figures.

A designates the hot cylinder, having below it a heater, A', within which the air is heated by a fire upon the grate $A^2$, or by any other heating device external to the engine proper. The hot piston B, which is of trunk form, works within the cylinder A, and through a connecting-rod, C, transmits motion to a crank-shaft, D, on which is a fly wheel or pulley, D'.

No further description of the engine proper is necessary in order to enable my invention to be clearly understood.

$b\ b'$ designate two packings, which are commonly of leather of annular form, and which are reversed in position, the upper packing having its inner edge portion turned upward, and the lower packing, $b'$, having its upper edge portion turned downward. These packings are separated by a ring, c, introduced between them, and above the upper packing, b, is a cap-ring or gland-ring, d, which serves to tightly secure the packings in place.

In hot-air engines as usually heretofore constructed the packing-ring $b'$ has rested directly upon and been supported by an integral portion of the hot cylinder A, and as the continuity of the conducting metal has not been broken in any way the heat from the cylinder, in the absence of any precaution, would soon burn out or deteriorate the packing. To prevent this it has been usual to construct the cylinder with a water-jacket, e, surrounding its upper portion adjacent to the packing, and as shown by dotted lines in the drawings. By my improved construction I dispense entirely with this jacket, and with the pipes for conducting water thereto and therefrom.

According to my invention the lower packing, b', instead of being supported directly upon an integral portion of the cylinder, is supported by a ring, f, which is made separate from the cylinder, and secured thereto by bolts h, having nuts h' at their top, and serve as a means of setting down the cap-ring or gland-ring d to tighten the packing. Even though the ring f be in direct metal-to-metal contact with the cylinder A, the joint between them will break continuity of metal between the packing and the cylinder, and will prevent any injurious degree of heat from being transmitted to the ring f, and received by the leather or other packing, b', supported thereon. To conduce to the same end I may introduce between the top of the cylinder A and the ring f a packing, i, of paper or other material which is a poor conductor of heat. A single ring, f, only may be interposed between the cylinder A and the packing b'; or I may still further carry out the purpose of my invention by dividing the ring f, as shown by dotted lines f' in Fig. 2, or making the ring in two parts superposed one on another.

It will be understood that my invention is equally applicable whether two packing-rings, b b', having an interposed ring, c, be employed, or a single packing-ring, such as b', with a cap-ring or gland-ring, d, properly constructed and fitting directly upon it.

What I claim as my invention, and desire to secure by Letters Patent, is—

1. The combination, with the cylinder and piston of a hot-air engine, and a packing of a material liable to injury by heat surrounding the piston, and which is depended on to prevent leakage of air, of a ring or rings made separate from and secured to the cylinder, and upon which the packing is supported, whereby the continuity of metal in the cylinder is broken between the hottest portion of the cylinder and the packing, and the packing is thereby preserved from injury without the employment of a water-jacket, substantially as herein described.

2. The combination, with the cylinder and piston of a hot-air engine, and a packing of a material liable to injury by heat surrounding the piston, and which is depended on to prevent leakage of air, of a ring or rings made separate from and secured to the cylinder, and upon which the packing is supported, and a material which is a poor conductor of heat interposed between the ring or rings and the cylinder, whereby the continuity of metal in the cylinder is broken between the hottest part of the cylinder and the packing, and the packing is preserved from injury without the employment of a water-jacket, substantially as herein described.

3. The combination, with the cylinder and piston of a hot-air engine, of the reversed packings b b' and the interposed ring c, the ring f, or rings interposed between the lower packing and the cylinder, and made separate from the cylinder, and the cap-ring or gland-ring d, substantially as and for the purpose herein described.

THOMAS J. RIDER.

Witnesses:
C. C. CAPES,
HARRY F. LYTLE.